United States Patent
Huang et al.

(10) Patent No.: US 12,165,423 B2
(45) Date of Patent: Dec. 10, 2024

(54) SCENE RECOGNITION BASED NATURAL LANGUAGE TRANSLATION

(71) Applicant: International Business Machines Corporation, Armonk, NY (US)

(72) Inventors: Chao Yuan Huang, Taipei (TW); Yuan Jie Zhang, Ningbo (CN); Yu Jie Gu, Beijing (CN); Yan Xiu Wu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 502 days.

(21) Appl. No.: 17/517,810

(22) Filed: Nov. 3, 2021

(65) Prior Publication Data

US 2023/0140570 A1 May 4, 2023

(51) Int. Cl.
| G06F 40/58 | (2020.01) |
| G06V 20/20 | (2022.01) |
| G06V 20/62 | (2022.01) |
| G10L 13/00 | (2006.01) |
| G10L 15/26 | (2006.01) |

(52) U.S. Cl.
CPC .............. *G06V 20/62* (2022.01); *G06F 40/58* (2020.01); *G06V 20/20* (2022.01); *G10L 13/00* (2013.01); *G10L 15/26* (2013.01)

(58) Field of Classification Search
None
See application file for complete search history.

(56) References Cited

U.S. PATENT DOCUMENTS

| 8,144,990 | B2* | 3/2012 | Englund | G06V 10/10 |
| | | | | 382/181 |
| 11,604,930 | B2* | 3/2023 | Dozier, III | G06F 40/166 |
| 2012/0330646 | A1 | 12/2012 | Andrade et al. | |
| 2016/0328394 | A1* | 11/2016 | Cuthbert | G06F 40/58 |
| 2016/0371256 | A1* | 12/2016 | Mauser | G06F 40/58 |
| 2017/0060855 | A1* | 3/2017 | Song | G06F 40/55 |
| 2017/0124071 | A1* | 5/2017 | Huang | G06F 40/51 |
| 2022/0164589 | A1* | 5/2022 | Upshinskii | G06N 3/045 |
| 2023/0062187 | A1* | 3/2023 | Holland | H04N 23/64 |

FOREIGN PATENT DOCUMENTS

| CN | 101620680 A | 1/2010 |
| CN | 104881405 A | 9/2015 |
| KR | 102142238 B1 | 8/2020 |
| WO | 2021056782 A1 | 4/2021 |

* cited by examiner

*Primary Examiner* — Dung D Tran
(74) *Attorney, Agent, or Firm* — Garg Law Firm, PLLC; Rakesh Garg; Nicholas Welling

(57) ABSTRACT

From an input image comprising a portion of text, the portion of text is extracted. The portion of text comprises text in a first natural language. The input image is classified into a candidate scene within a set of predefined scenes. The candidate scene is scored according to a quality measure. Using a predefined scene parameter of the scored candidate scene, the portion of text is translated. In the input image, the portion of text is replaced. with the translated portion of text.

20 Claims, 14 Drawing Sheets

*Fig. 10*

SCENARIO EVALUATION 1010

| | WEIGHT | QUALITY | CANDIDATE SCENE 860 MALL FOOD COURT |
|---|---|---|---|
| IMAGE | 1 | 2 | |
| SOUND | 0.8 | 2 | |
| LOCATION | 0.8 | 3 | |
| EVENT | 0.5 | 1 | |
| SCORE | | | 6.5 |

SCENARIO EVALUATION 1020

| | WEIGHT | QUALITY | CANDIDATE SCENE 960 AIRPORT WAITING AREA |
|---|---|---|---|
| IMAGE | 1 | 2 | |
| SOUND | 0.8 | 2 | |
| LOCATION | 0.8 | 3 | |
| EVENT | 0.5 | 3 | |
| SCORE | | | 7.5 |

SCENARIO 1030

SCENE RECOGNITION BASED NATURAL LANGUAGE TRANSLATION

BACKGROUND

The present invention relates generally to a method, system, and computer program product for automated natural language translation. More particularly, the present invention relates to a method, system, and computer program product for scene recognition based natural language translation.

Natural language translation is the task of automatically converting one human natural language into another, while preserving the meaning of the input language and producing fluent output in the output language. A human natural language is a language human users typically use to communicate, such as English, French, or Japanese. Although typically used on text in the input and output natural languages, natural language translation is also usable on audio of a language, by converting the audio to corresponding text, translating the text, and converting the translated text into audio in the new language. Similarly, natural language translation is also usable on natural language text within a still image or video, by recognizing the text within an image, translating the text, and replacing the original text in the source image with translated text.

SUMMARY

The illustrative embodiments provide a method, system, and computer program product. An embodiment includes a method that extracts, from an input image comprising a portion of text, the portion of text, the portion of text comprising text in a first natural language. An embodiment classifies, into a candidate scene within a set of predefined scenes, the input image. An embodiment scores, according to a quality measure, the candidate scene, the scoring resulting in a scored candidate scene. An embodiment translates, using a predefined scene parameter of the scored candidate scene, the portion of text, the translating resulting in a translated portion of text. An embodiment replaces, in the input image, the portion of text with the translated portion of text.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 10 depicts a continued example of scene recognition based natural language translation in accordance with an illustrative embodiment;

DETAILED DESCRIPTION

Figure 1:
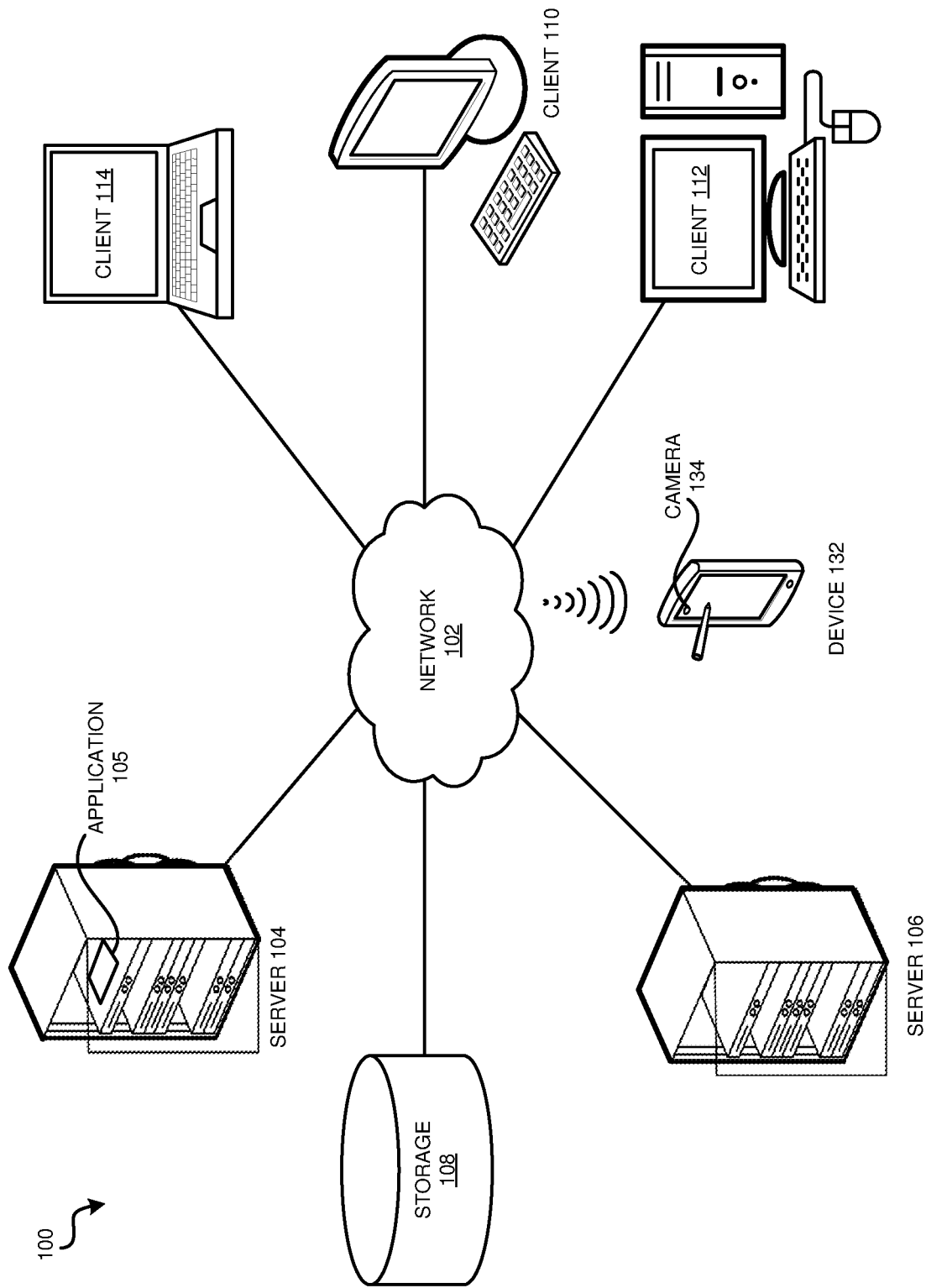
FIG. 1 depicts a block diagram of a network of data processing systems in which illustrative embodiments may be implemented.

The illustrative embodiments recognize that automatic translation between human languages, done by a machine, is much faster than translation performed by a human expert. In addition, translation performed by a human expert does not scale well to processing large quantities of image data, requires extensive training of an expert, cannot easily be generalized to multiple languages, and is more expensive than automatic translation. Automatically translating natural language text within a still image or video is typically performed by recognizing the text within an image, translating the text, and replacing the original text in the source image with translated text. Similarly, automatically translating a natural language audio component of audio-video content is typically performed by converting the audio to corresponding text, translating the text, converting the translated text into audio in the new language, and replacing the original audio component with the translated audio component. However, words and phrases (groups of words) often have more than one meaning. For example, a solution could mean the answer to a mathematical problem, a way to repair something, or a combination of two chemicals. As another example, a pupil could mean a student or an eye component. As a third example, a shower could mean a type of weather or a method of washing oneself.

The illustrative embodiments also recognize that a word or phrase's textual context is often used to resolve multiple meanings. For example, in the phrase, "The weather forecast is for showers on Tuesday," it is clear that "shower" means a type of weather. However, sufficient textual context is not always available, particularly when a word or phrase to be translated is part of a still image or video. For example, a still image depicting a weather forecast might only include the words "Tuesday" and "showers", without additional words that might clarify the intended meaning of "showers". Thus, the illustrative embodiments recognize that there is an unmet need to provide additional context for use in clarifying multiple meanings when performing automatic translation.

The illustrative embodiments recognize that the presently available tools or solutions do not address these needs or provide adequate solutions for these needs. The illustrative embodiments used to describe the invention generally address and solve the above-described problems and other problems related to scene recognition based natural language translation.

An embodiment can be implemented as a software application. The application implementing an embodiment can be configured as a modification of an existing natural language translation system, as a separate application that operates in conjunction with an existing natural language translation system, a standalone application, or some combination thereof.

Particularly, some illustrative embodiments provide a method that extracts a portion of text from an input image comprising the portion of text, classifies the input image into a candidate scene within a set of predefined scenes, scores the candidate scene according to a quality measure, and translates the portion of text using a predefined scene parameter of the scored candidate scene.

An embodiment receives an input image including a portion of text to be automatically translated to another human language. In one embodiment, the input image is a still image. In another embodiment, the input image is a frame of video. In another embodiment, the input image and text portion are separate, for example because the input image is a frame representing a video segment and the text portion was converted to text from an audio component of the video segment. Optionally, an embodiment also receives metadata of the input image. Some non-limiting examples of metadata of the input image are a timestamp of the input image (e.g. the image was captured at 3 pm on October 18), a location corresponding to the input image (e.g. the image was captured at a particular latitude and longitude by a camera including a Global Positioning System receiver or other location capability), and audio data associated with the image (e.g. an audio segment captured along with the input image. One embodiment also has access to data in a location database, for use in associating a location with a particular type of building or activity. One embodiment also has access to data in an event database, for use in associating a timestamp with a particular type of event or activity.

An embodiment classifies an input image into at least one of a set of predefined scenes. A selected predefined scene is also called a candidate scene. Each predefined scene includes a code corresponding to the scene, a text label naming the scene, or both a code and a text label. For example, one predefined scene might be labelled as "airport gate", have a code of 123, or have both a code and a corresponding label. In one embodiment, the set of predefined scenes is structured from more general to more specific. For example, one predefined scene might have a code of 100 and a label of "indoor place", A specific type of indoor place might have a code of 110 and a label of "eating place". There might also be several specific types of eating places, such as "Asian restaurant" with code 111, "European restaurant" with code 112, "cafeteria" with code 113, and "fast food place" with code 114. Each predefined scene also includes one or more scene parameters used to affect the translation process described herein.

To classify the input image into at least one candidate scene, an embodiment uses an image classification model. One type of image classification model attempts to recognize known elements within an image (e.g., a tree, car, or piece of furniture) and classifies the image according to the number and type of recognized known elements. Another type of image classification model does not attempt to recognize elements within an image, but instead compares the image to other images that are representative of a particular scene. Another type of image classification model uses a combination of these two approaches. Techniques for implementing image classification models are presently known. Other methods of performing image classification are also known and contemplated within the scope of the illustrative embodiments.

An embodiment also computes a quality score corresponding to the image data based classification. In one embodiment, the quality score increases with the specificity of the input image. For example, an image of a well-known landmark such as the Statue of Liberty might have a quality score of 3, while a more generic image such as that of an urban apartment building might have a quality score of 2, and a still more generic image such as that of a lake, without any specific features that would help identify which lake it is, might have a quality score of 1. In another embodiment, the quality score increases with an image classification model's confidence level in the classification. Other quality score schemes are also possible and contemplated within the scope of the illustrative embodiments.

To classify the input image into at least one candidate scene, an embodiment uses audio data corresponding to the image, if audio data is available. In particular, one embodiment uses a speech recognition model to attempt to convert audio data to corresponding text, then uses the text to classify the image. For example, an announcement that a flight is boarding at gate 12 might be used to classify an image into a scene labelled "airport waiting area", while an announcement that an order is ready might be used to classify an image into a scene labelled "restaurant". Another embodiment uses a sound recognition model to attempt to recognize a known sound within audio data. For example, a sound identified as a jet engine might be used to classify an image into a scene labelled "airport waiting area", while a sound identified as a particular song might be used to classify an image into a scene labelled "music venue". Techniques for implementing speech and sound recognition models are presently known. Other methods of analyzing and classifying audio data are also known and contemplated within the scope of the illustrative embodiments.

An embodiment also computes a quality score corresponding to the audio data based classification. In one embodiment, the quality score increases with the specificity of the audio data. For example, audio identifying a well-known landmark (e.g. audio such as "Welcome to the Statue of Liberty") might have a quality score of 3, while more generic audio (e.g. "your order is ready") might have a quality score of 2, and still more generic audio such as overlapping conversations, without any specific features that would help identify where the conversations are occurring, might have a quality score of 1. In another embodiment, the quality score increases with a speech recognition or sound recognition model's confidence level in the classification. Other quality score schemes are also possible and contemplated within the scope of the illustrative embodiments.

To classify the input image into at least one candidate scene, an embodiment uses location data corresponding to the image, if location data is available. In particular, one embodiment consults a location database that correlates location data, such as latitude and longitude of a location at which the image was captured, with a particular type of building or activity. For example, location data matching, within a threshold amount, known coordinates of an airport might be used to classify an image into a scene labelled "airport waiting area", while location data matching, within a threshold amount, known coordinates of a restaurant might be used to classify an image into a scene labelled "restaurant".

An embodiment also computes a quality score corresponding to the location data based classification. In one embodiment, the quality score increases with the specificity of the location data. For example, location data identifying a well-known landmark (e.g. the Statue of Liberty) might have a quality score of 3, while location data identifying only a city street might have a quality score of 2, and location data identifying only a specific town might have a quality score of 1. In another embodiment, the quality score increases with a confidence level in the classification. Other quality score schemes are also possible and contemplated within the scope of the illustrative embodiments.

To classify the input image into at least one candidate scene, an embodiment uses time data corresponding to the image, if time data is available. In particular, one embodiment consults an event or news database that correlates time data, such as when the image was captured, with a particular type of event or activity. For example, time data within known operating hours of an outdoor market held in a park might be used to classify an image into a scene labelled "outdoor market", while time data outside the known operating hours of the outdoor market might be used to classify an image of the same area as "park".

An embodiment also computes a quality score corresponding to the time data based classification. In one embodiment, the quality score increases with the specificity of the time data. For example, an identification of an event occurring on a particular data at a particular time might have a quality score of 3, while an identification of an event occurring sometime within a particular week might have a quality score of 2, and an identification of an event occurring sometime within a particular month might have a quality score of 1. In another embodiment, the quality score increases with a confidence level in the classification. Other quality score schemes are also possible and contemplated within the scope of the illustrative embodiments.

An embodiment scores the classification into a candidate scene. To score the classification, one embodiment assigns a weight to each classification component used to classify an input image into a scene, then computes a sum of each weight multiplied by that component's quality score. For example, if the image classification, the sound classification, the location classification, and the event classification are assigned weights of 1, 0.8, 0.8, and 0.5 respectively, and the quality scores corresponding to each classification are 2, 2, 3, and 3 respectively, an overall score for the candidate scene might be 1*2+0.8*2+0.8*3+0.5*3=7.5. In another embodiment, all of the weights are equal. Another embodiment scores a scene classification without using component scores, according to an overall confidence level in the classification. Another embodiment scores a scene classification using another presently known method.

An embodiment selects, as a scenario for use in the translation process, a highest-scored candidate scene in a set of scored candidate scenes. Another embodiment selects, as a scenario for use in the translation process, a highest-scored candidate scene that also has a score above a threshold amount.

An embodiment extracts text to be translated from a received image. In one embodiment, the portion to be translated includes text within a still image or video. In another embodiment, the portion to be translated includes text converted from into text from an audio component of a video segment.

An embodiment uses one or more predefined scene parameters of the selected scenario to automatically translate the extracted text from one natural language to another. One embodiment divides the extracted text into portions. In one embodiment, a portion of extracted text is a sentence, although the sentence need not be grammatically correct. Another embodiment uses a presently known clustering technique to identify one or more groups of words within a threshold distance of each other in the input image, with each group at least another threshold distance from a word in another group in the image. Another embodiment treats all of the extracted text as one portion.

An embodiment attempts to group words within a portion of the extracted text into one or more phrases. A phrase is a word or group of words standing together as a conceptual unit. In particular, one embodiment generates a phrase table from a stored phrase database based on words in the portion, and uses a scene parameter and a presently known phrase grouping technique to score phrases in the phrase table that are made of adjacent words. One embodiment uses a presently known technique to score phrases, and uses the scene parameter to adjust a phrase's score. One or more highest-scored phrases are treated as single words in later translation stages. Phrase grouping helps translate concepts that are expressed in one word in a language but span multiple words in another language. For example, the word thunderbolt in English translates to "coup de foudre" in French.

An embodiment uses a scene parameter and a presently known technique to tag a words or phrase with a part of speech tag. One embodiment uses a presently known technique to tag phrases, and uses the scene parameter to adjust a phrase's tag. Some non-limiting examples of part of speech tags are a noun, verb, adjective, and adverb.

An embodiment uses a scene parameter, the part of speech tag, and a presently known technique to translate tagged words or phrases. One embodiment uses a presently known technique to translate tagged phrases, and uses the scene parameter to adjust a translation. Part of speech tags can affect translation because some words may have different translations depending on their part of speech. A scene parameter can affect translation because some words may have different translations depending on their context, as depicted in a scene. For example, "table" might refer to a method of showing information or to a piece of furniture, and whether a scene depicts a collection of data or a restaurant might help resolve which meaning is most appropriate when translating.

An embodiment uses a scene parameter, the part of speech tag, and a presently known technique to rearrange translated words or phrases as appropriate for the new language. One embodiment uses a presently known technique to rearrange translated words or phrases, and uses the scene parameter to select a rearrangement if more than one rearrangement is possible. For example, when translating to a language in which a verb is typically at the end of a sentence (e.g. German or Japanese), a verb or verb phrase may have to be moved from another location to the end of the sentence.

An embodiment uses a scene parameter, the part of speech tag, and a presently known technique to replace one or more translated words or phrases with different ones, adjust punctuation if necessary, and add, remove, or adjust one or more connection words if necessary. One embodiment uses the scene parameter to select a replacement or adjustment if there are multiple possibilities. For example, a word with multiple meanings might have been translated incorrectly and require correction with a different translated word or phrase. As another example, punctuation usage may differ among languages and need adjustment.

An embodiment replaces the original text in the received image with corresponding translated text. Another embodiment does not replace the original text, but instead associates the original text with corresponding translated text, so that a user can access both original and translated text, for example in an annotated image. Another embodiment, which processed a text portion converted to text from an audio component of a video segment, converts the translated text to corresponding audio and replaces the original audio with the translated audio. Another embodiment, which processed a text portion converted to text from an audio component of a video segment, does not replace the original audio, and instead provides the translation in audio form (e.g. via an secondary audio channel) or in text form (e.g. as a text caption).

The manner of scene recognition based natural language translation described herein is unavailable in the presently available methods in the technological field of endeavor pertaining to automated natural language translation. A method of an embodiment described herein, when implemented to execute on a device or data processing system, comprises substantial advancement of the functionality of that device or data processing system in extracting a portion of text from an input image comprising the portion of text, classifying the input image into a candidate scene within a set of predefined scenes, scoring the candidate scene according to a quality measure, and translating the portion of text using a predefined scene parameter of the scored candidate scene.

The illustrative embodiments are described with respect to certain types of images, portions of text, natural languages, thresholds, scenes, scenarios, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
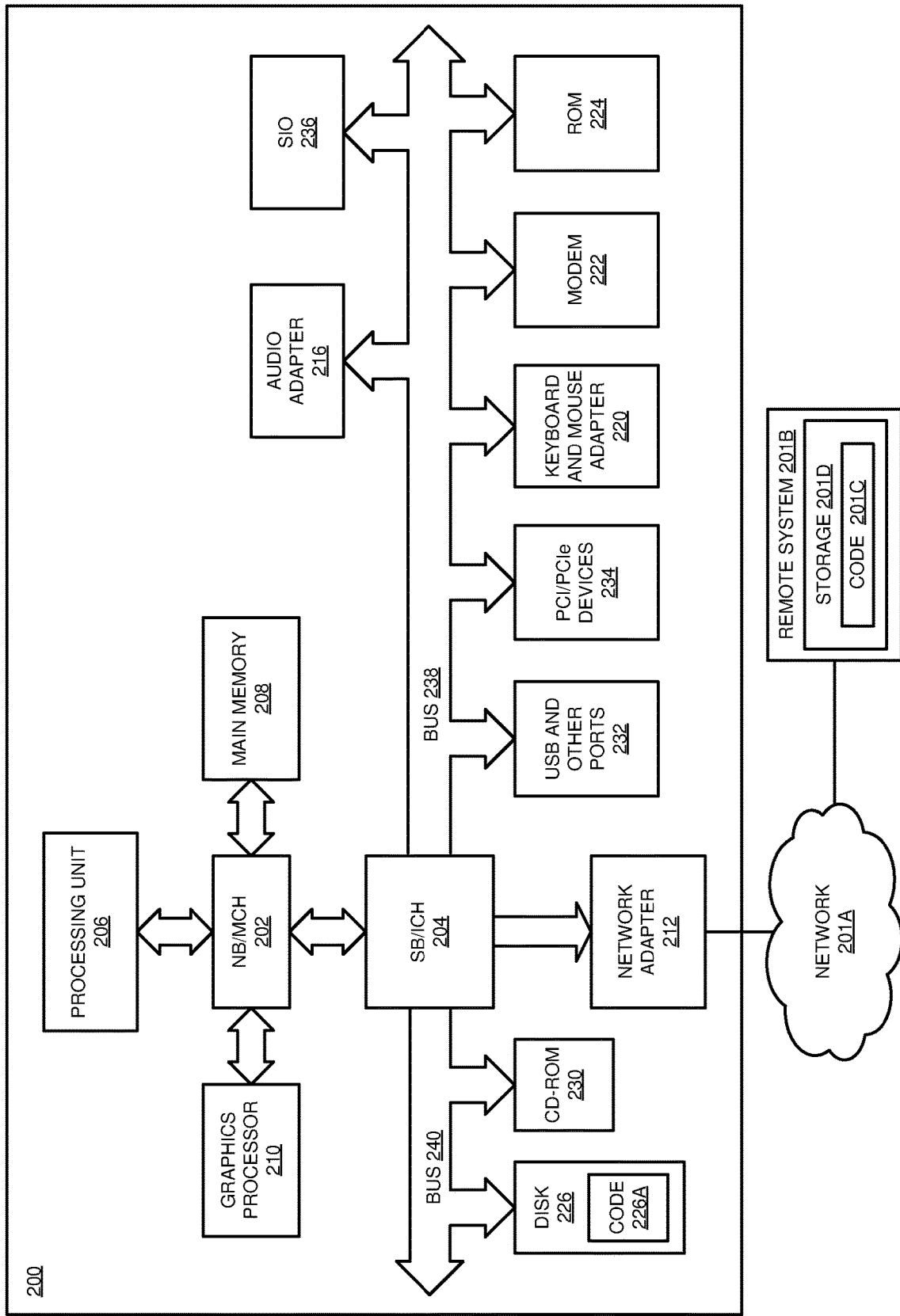
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
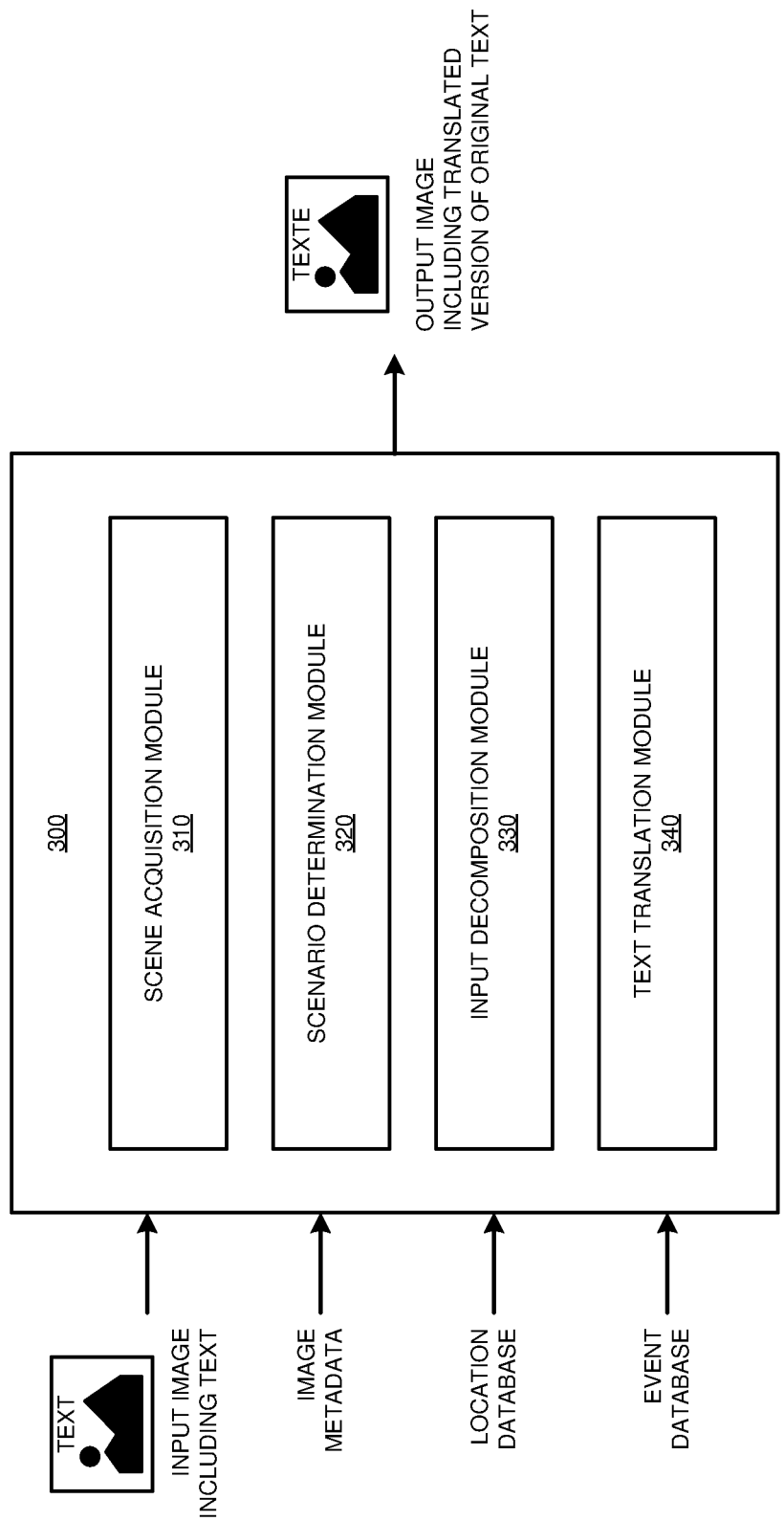
FIG. 3 depicts a block diagram of an example configuration for scene recognition based natural language translation in accordance with an illustrative embodiment.

With reference to FIG. 3, this figure depicts a block diagram of an example configuration for scene recognition based natural language translation in accordance with an illustrative embodiment. Application 300 is an example of application 105 in FIG. 1 and executes in any of servers 104 and 106, clients 110, 112, and 114, and device 132 in FIG. 1.

Application 300 receives an input image including a portion of text to be automatically translated to another human language. In one implementation of application 300, the input image is a still image. In another implementation of application 300, the input image is a frame of video. In another implementation of application 300, the input image and text portion are separate, for example because the input image is a frame representing a video segment and the text portion was converted to text from an audio component of the video segment. Application 300 also receives metadata of the input image. Application 300 also has access to data in a location database and an event database.

Scene acquisition module 310 classifies an input image into at least one of a set of predefined scenes. Each predefined scene includes a code corresponding to the scene, a text label naming the scene, or both a code and a text label. In one implementation of module 310, the set of predefined scenes is structured from more general to more specific. Each predefined scene also includes one or more scene parameters used to affect the translation process described herein.

Scenario determination module 320 scores module 310's classification. To score the classification, one implementation of module 320 assigns a weight to each classification component used to classify an input image into a scene, then computes a sum of each weight multiplied by that component's quality score. In another implementation of module 320, all of the weights are equal. Another implementation of module 320 scores a scene classification without using component scores, according to an overall confidence level in the classification.

Module 320 selects, as a scenario for use in the translation process, a highest-scored candidate scene in a set of scored candidate scenes. Another implementation of module 320 selects, as a scenario for use in the translation process, a highest-scored candidate scene that also has a score above a threshold amount.

Input decomposition module 330 extracts text to be translated from a received image. In one implementation of module 330, the portion to be translated includes text within a still image or video. In another implementation of module 330, the portion to be translated includes text converted from into text from an audio component of a video segment.

Text translation module 340 uses one or more predefined scene parameters of the selected scenario to automatically translate the extracted text from one natural language to another. One embodiment divides the extracted text into portions. In one embodiment, a portion of extracted text is a sentence, although the sentence need not be grammatically correct. Another embodiment uses a presently known clustering technique to identify one or more groups of words within a threshold distance of each other in the input image, with each group at least another threshold distance from a word in another group in the image. Another embodiment treats all of the extracted text as one portion.

Module 340 attempts to group words within a portion of the extracted text into one or more phrases, tags a word or phrase with a part of speech tag, and translates tagged words or phrases. Module 340 also rearranges translated words or phrases as appropriate for the new language, and replaces one or more translated words or phrases with different ones, adjusts punctuation if necessary, and adds, removes, or adjusts one or more connection words if necessary.

Application 300 replaces the original text in the received image with corresponding translated text. Another implementation of application 300 does not replace the original text, but instead associates the original text with corresponding translated text, so that a user can access both original and translated text.

Figure 4:
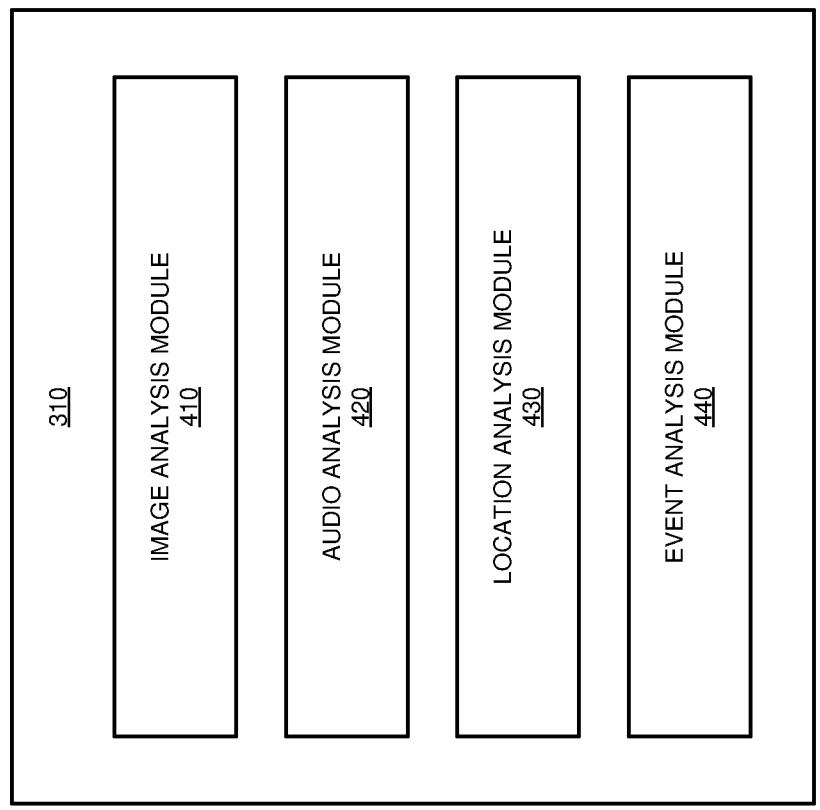
FIG. 4 depicts a block diagram of an example configuration for scene recognition based natural language translation in accordance with an illustrative embodiment.

With reference to FIG. 4, this figure depicts a block diagram of an example configuration for scene recognition based natural language translation in accordance with an illustrative embodiment. In particular, FIG. 4 depicts more detail of module 310 in FIG. 3.

To classify the input image into at least one candidate scene, image analysis module 410 uses an image classification model. Module 410 also computes a quality score corresponding to the image data based classification. In one implementation of module 410, the quality score increases with the specificity of the input image. In another implementation of module 410, the quality score increases with an image classification model's confidence level in the classification.

To classify the input image into at least one candidate scene, audio analysis module 420 uses audio data corresponding to the image, if audio data is available. In particular, one implementation of module 420 uses a speech recognition model to attempt to convert audio data to corresponding text, then uses the text to classify the image. Another implementation of module 420 uses a sound recognition model to attempt to recognize a known sound within audio data. Module 420 also computes a quality score corresponding to the audio data based classification. In one implementation of module 420, the quality score increases with the specificity of the audio data. In another implementation of module 420, the quality score increases with a speech recognition or sound recognition model's confidence level in the classification.

To classify the input image into at least one candidate scene, location analysis module 430 uses location data corresponding to the image, if location data is available. In particular, one implementation of module 430 consults a location database that correlates location data, such as latitude and longitude of a location at which the image was captured, with a particular type of building or activity. Module 430 also computes a quality score corresponding to the location data based classification. In one implementation of module 430, the quality score increases with the specificity of the location data. In another implementation of module 430, the quality score increases with a confidence level in the classification.

To classify the input image into at least one candidate scene, event analysis module 440 uses time data corresponding to the image, if time data is available. In particular, one implementation of module 440 consults an event or news database that correlates time data, such as when the image was captured, with a particular type of event or activity. Module 440 also computes a quality score corresponding to the time data based classification. In one implementation of module 440, the quality score increases with the specificity of the time data. In another implementation of module 440, the quality score increases with a confidence level in the classification.

Figure 5:
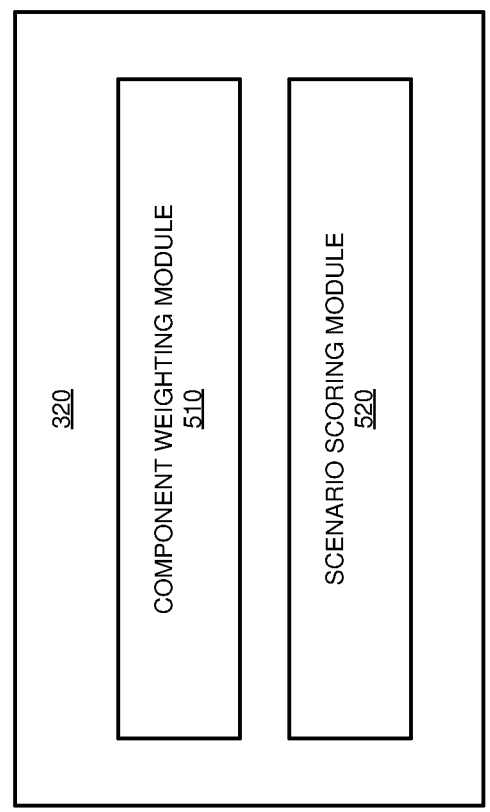
FIG. 5 depicts a block diagram of an example configuration for scene recognition based natural language translation in accordance with an illustrative embodiment.

With reference to FIG. 5, this figure depicts a block diagram of an example configuration for scene recognition based natural language translation in accordance with an illustrative embodiment. In particular, FIG. 5 depicts more detail of module 320 in FIG. 3.

Component weighting module 510 assigns a weight to each classification component used to classify an input image into a scene. In another implementation of module 510, all of the weights are equal.

Scenario scoring module 520 computes a sum of each weight multiplied by that component's quality score. Another implementation of module 520 scores a scene classification without using component scores, according to an overall confidence level in the classification.

Module 520 selects, as a scenario for use in the translation process, a highest-scored candidate scene in a set of scored candidate scenes. Another implementation of module 520 selects, as a scenario for use in the translation process, a highest-scored candidate scene that also has a score above a threshold amount.

Figure 6:
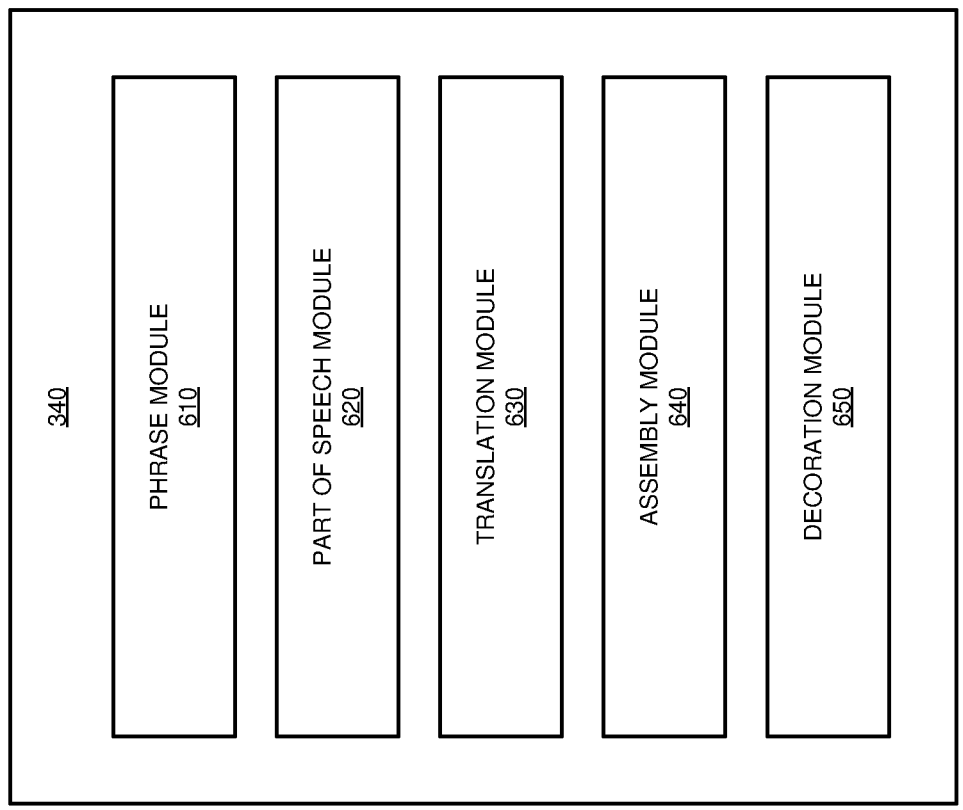
FIG. 6 depicts a block diagram of an example configuration for scene recognition based natural language translation in accordance with an illustrative embodiment.

With reference to FIG. 6, this figure depicts a block diagram of an example configuration for scene recognition based natural language translation in accordance with an illustrative embodiment. In particular, FIG. 6 depicts more detail of module 340 in FIG. 3.

Phrase module 610 attempts to group words within a portion of the extracted text into one or more phrases. In particular, phrase module 610 generates a phrase table from a stored phrase database based on words in the portion, and uses a scene parameter and a presently known phrase grouping technique to score phrases in the phrase table that are made of adjacent words. One implementation of module 610 uses a presently known technique to score phrases, and uses the scene parameter to adjust a phrase's score. The highest-scored phrases are treated as single words in later translation stages.

Part of speech module 620 uses a scene parameter and a presently known technique to tag a words or phrase with a part of speech tag. Translation module 630 uses a scene parameter, the part of speech tag, and a presently known technique to translate tagged words or phrases. Assembly module 640 uses a scene parameter, the part of speech tag, and a presently known technique to rearrange translated words or phrases as appropriate for the new language. Decoration module 650 uses a scene parameter, the part of speech tag, and a presently known technique to replace one or more translated words or phrases with different ones, adjust punctuation if necessary, and add, remove, or adjust one or more connection words if necessary.

Figure 7:
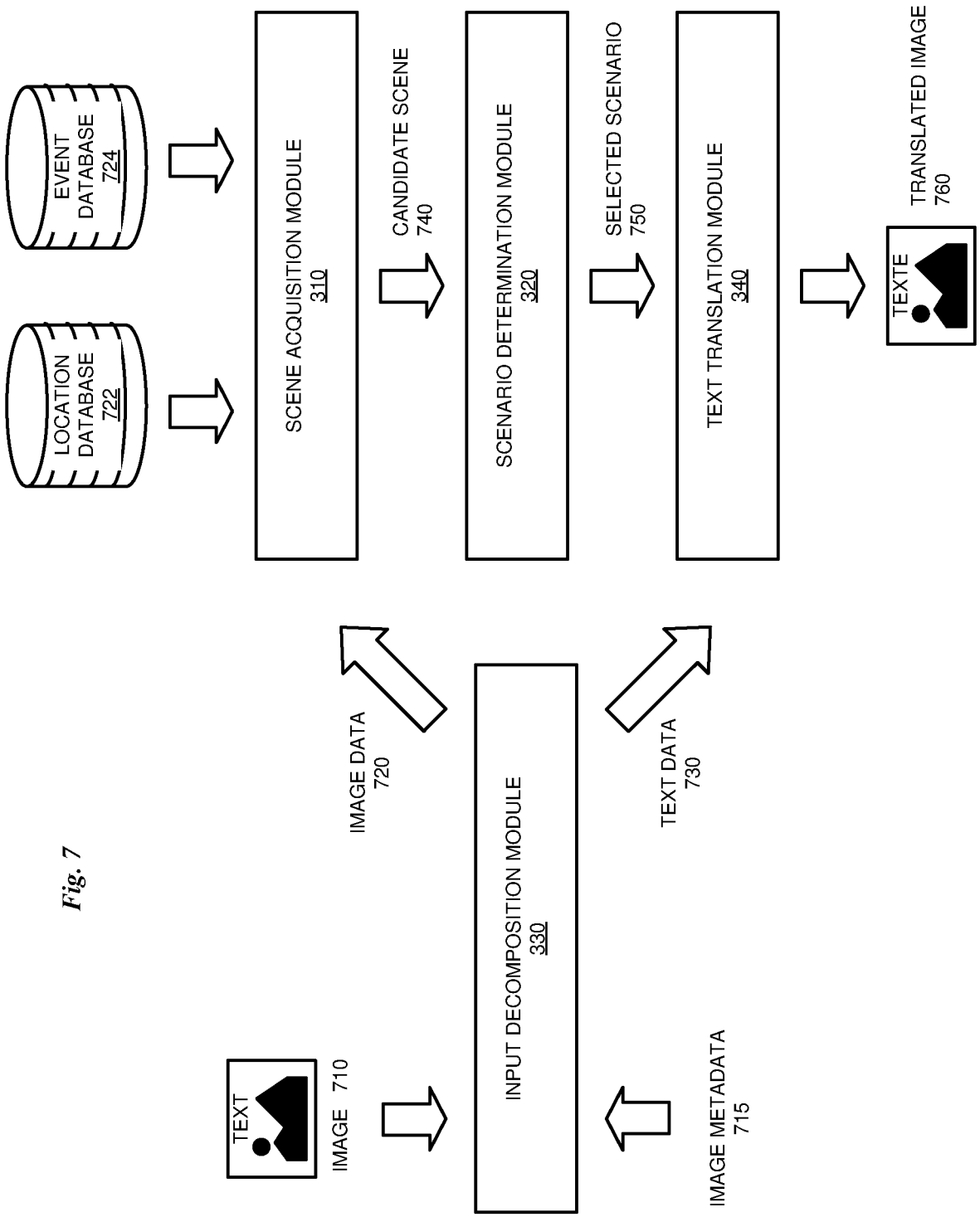
FIG. 7 depicts an example of scene recognition based natural language translation in accordance with an illustrative embodiment.

With reference to FIG. 7, this figure depicts an example of scene recognition based natural language translation in accordance with an illustrative embodiment. The example can be executed using application 300 in FIG. 3. Scene acquisition module 310, scenario determination module 320, input decomposition module 330, and text translation module 340 are the same as scene acquisition module 310, scenario determination module 320, input decomposition module 330, and text translation module 340 in FIG. 3.

Image 710 is an input image including a portion of text to be automatically translated to another human language. Image metadata 715 is metadata of the input image. Input decomposition module 330 extracts text data 730, text to be translated from image 710. Image data 720 includes image 710 and image metadata 715.

Scene acquisition module 310 uses location database 722 and event database 724 to classify image data 720 into at least one of a set of predefined scenes, such as candidate scene 740. Scenario determination module 320 scores the classification, and selects, as a scenario for use in the translation process, selected scenario 750—a highest-scored candidate scene 740. Text translation module uses selected scenario 750 to translate text data 730, producing translated image 760, in which the original text in image 710 has been replaced with corresponding translated text.

Figure 8:
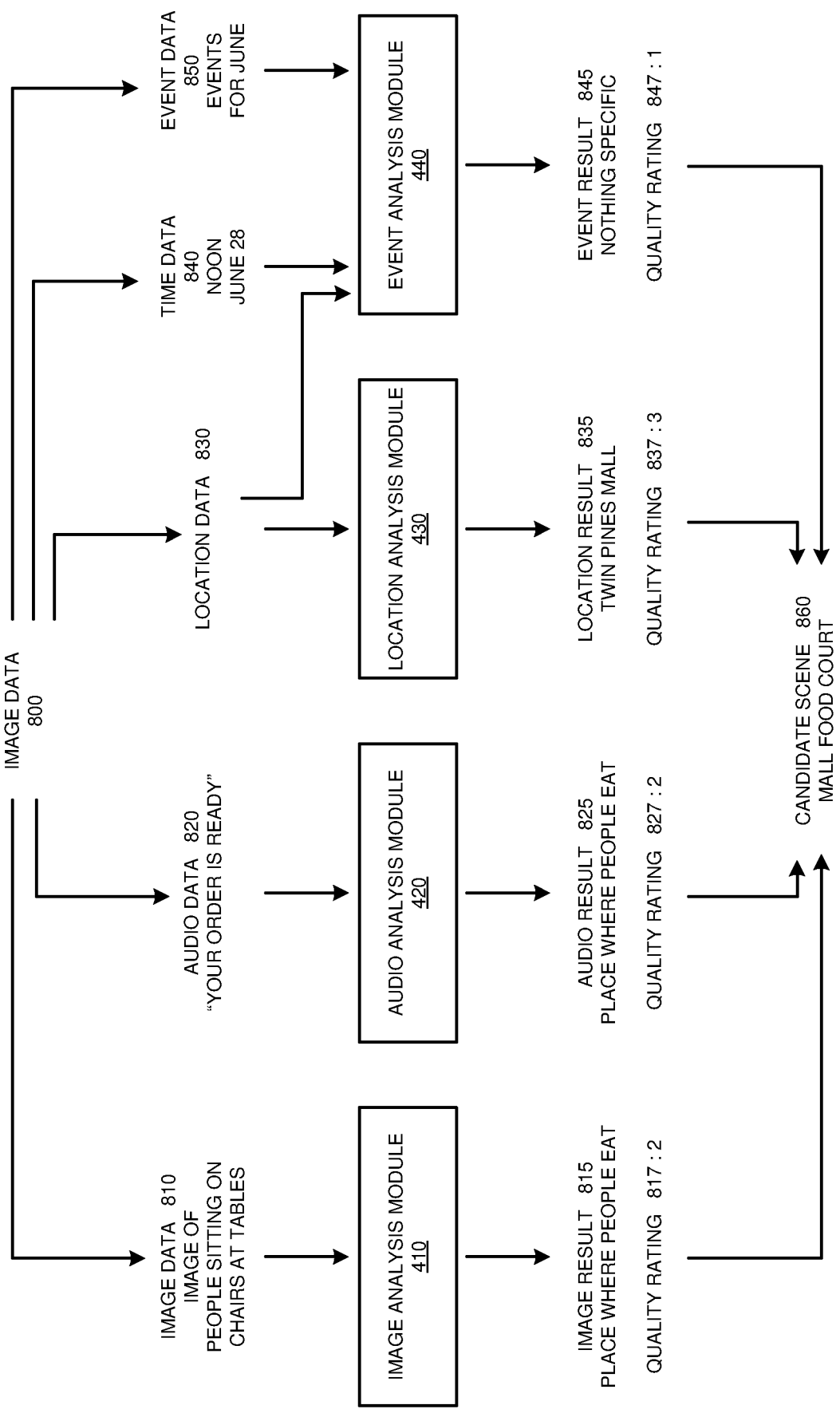
FIG. 8 depicts another example of scene recognition based natural language translation in accordance with an illustrative embodiment.

With reference to FIG. 8, this figure depicts another example of scene recognition based natural language translation in accordance with an illustrative embodiment. The example can be executed using application 300 in FIG. 3. Image analysis module 410, audio analysis module 420, location analysis module 430, and event analysis module 440 are the same as image analysis module 410, audio analysis module 420, location analysis module 430, and event analysis module 440 in FIG. 4.

Image data 800 includes image data 810 (an image of people sitting on chairs at tables), audio data 820 (a voice announcing, "Your order is ready"), location data 830 (the location where the image was captured), time data 840 (the time at which the image was captured), and event data 850 (events for June). To classify image data 800 into at least one candidate scene, image analysis module 410 uses an image classification model to analyze image data 810, determining image result 815 and corresponding quality rating 817. In quality rating 817, the quality score increases with the specificity of the input image, on a 1-3 scale described herein. To classify image data 800 into at least one candidate scene, audio analysis module 420 uses a speech recognition model and a sound recognition model to analyze audio data 820, determining audio result 825 and corresponding quality rating 827. In quality rating 827, the quality score increases with the specificity of the audio data, on a 1-3 scale described herein. To classify image data 800 into at least one candidate scene, location analysis module 430 analyzes location data 830, determining location result 835 and corresponding quality rating 837. In quality rating 837, the quality score increases with the specificity of the location data, on a 1-3 scale described herein. To classify image data 800 into at least one candidate scene, event analysis module 440 uses time data 840 and event data 850, determining event result 845 and corresponding quality rating 847. In quality rating 837, the quality score increases with the specificity of the location data, on a 1-3 scale described herein. The results are classified into candidate scene 860.

Figure 9:
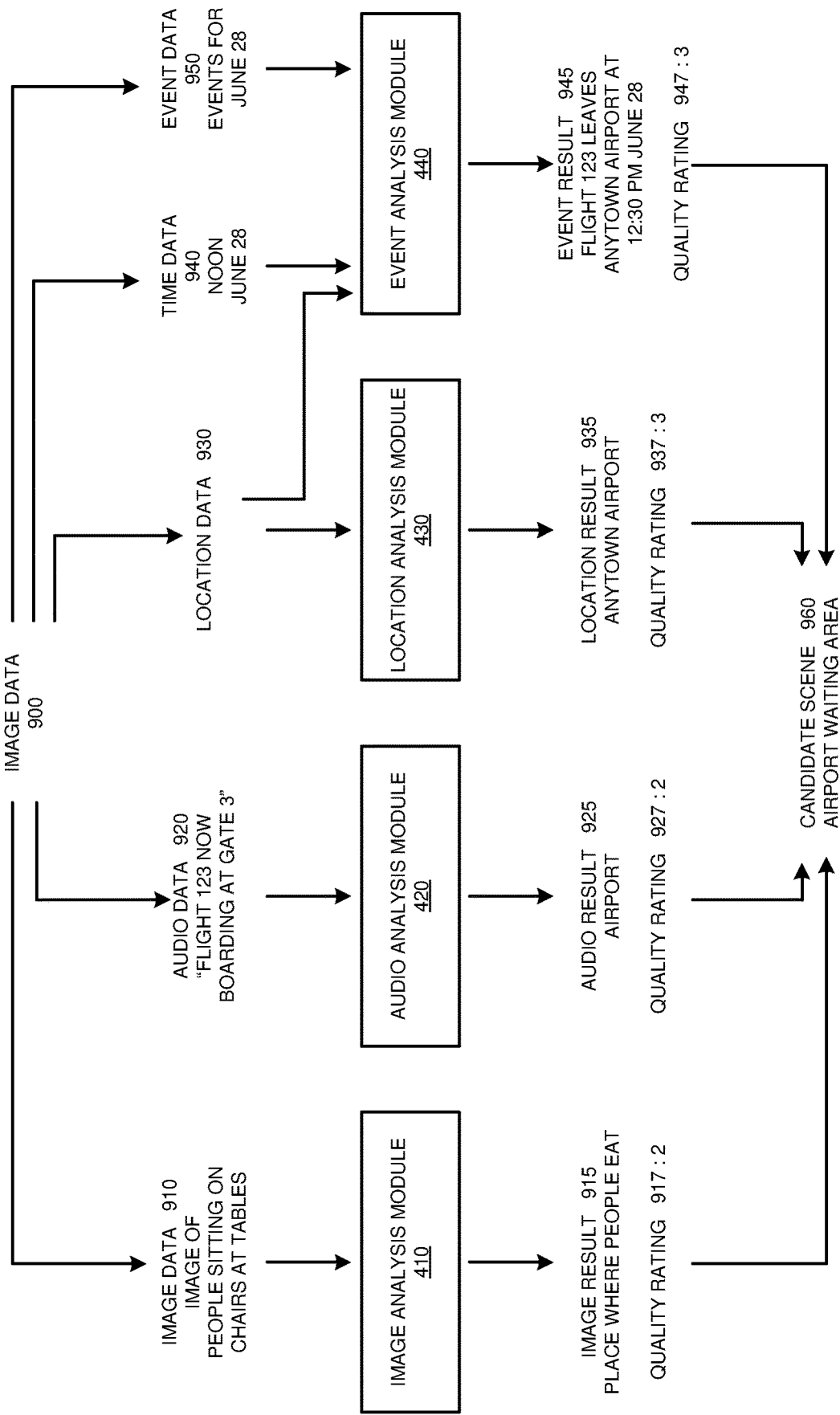
FIG. 9 depicts another example of scene recognition based natural language translation in accordance with an illustrative embodiment.

With reference to FIG. 9, this figure depicts another example of scene recognition based natural language translation in accordance with an illustrative embodiment. The example can be executed using application 300 in FIG. 3. Image analysis module 410, audio analysis module 420, location analysis module 430, and event analysis module 440 are the same as image analysis module 410, audio analysis module 420, location analysis module 430, and event analysis module 440 in FIG. 4.

Image data 900 includes image data 910 (an image of people sitting on chairs at tables), audio data 920 (a voice announcing, "flight 123 now boarding at gate 3"), location data 930 (the location where the image was captured), time data 940 (the time at which the image was captured), and event data 950 (events for June 28). To classify image data 900 into at least one candidate scene, image analysis module 410 uses an image classification model to analyze image data 910, determining image result 915 and corresponding quality rating 917. In quality rating 917, the quality score increases with the specificity of the input image, on a 1-3 scale described herein. To classify image data 900 into at least one candidate scene, audio analysis module 920 uses a speech recognition model and a sound recognition model to analyze audio data 920, determining audio result 925 and corresponding quality rating 927. In quality rating 927, the quality score increases with the specificity of the audio data, on a 1-3 scale described herein. To classify image data 900 into at least one candidate scene, location analysis module 430 analyzes location data 930, determining location result 935 and corresponding quality rating 937. In quality rating 937, the quality score increases with the specificity of the location data, on a 1-3 scale described herein. To classify image data 900 into at least one candidate scene, event analysis module 440 uses time data 940 and event data 950, determining event result 945 and corresponding quality rating 947. In quality rating 937, the quality score increases with the specificity of the location data, on a 1-3 scale described herein. The results are classified into candidate scene 960.

With reference to FIG. 10, this figure depicts a continued example of scene recognition based natural language translation in accordance with an illustrative embodiment. The example can be executed using application 300 in FIG. 3. Candidate scene 860 is the same as candidate scene 860 in FIG. 8. Candidate scene 960 is the same as candidate scene 960 in FIG. 9.

Scenario evaluation 1010 depicts scoring of the classification into candidate scene 860, by assigning a weight to each classification component used to classify an input image into a scene and computing a sum of each weight multiplied by that component's quality score. Similarly, scenario evaluation 1020 depicts scoring of the classification into candidate scene 960, by assigning the same weights to each classification component used to classify an input image into a scene and computing a sum of each weight multiplied by that component's quality score. Because the score for candidate scene 960 is higher than that of candidate scene 860, candidate scene 960 is selected as scenario 1030.

Figure 11:
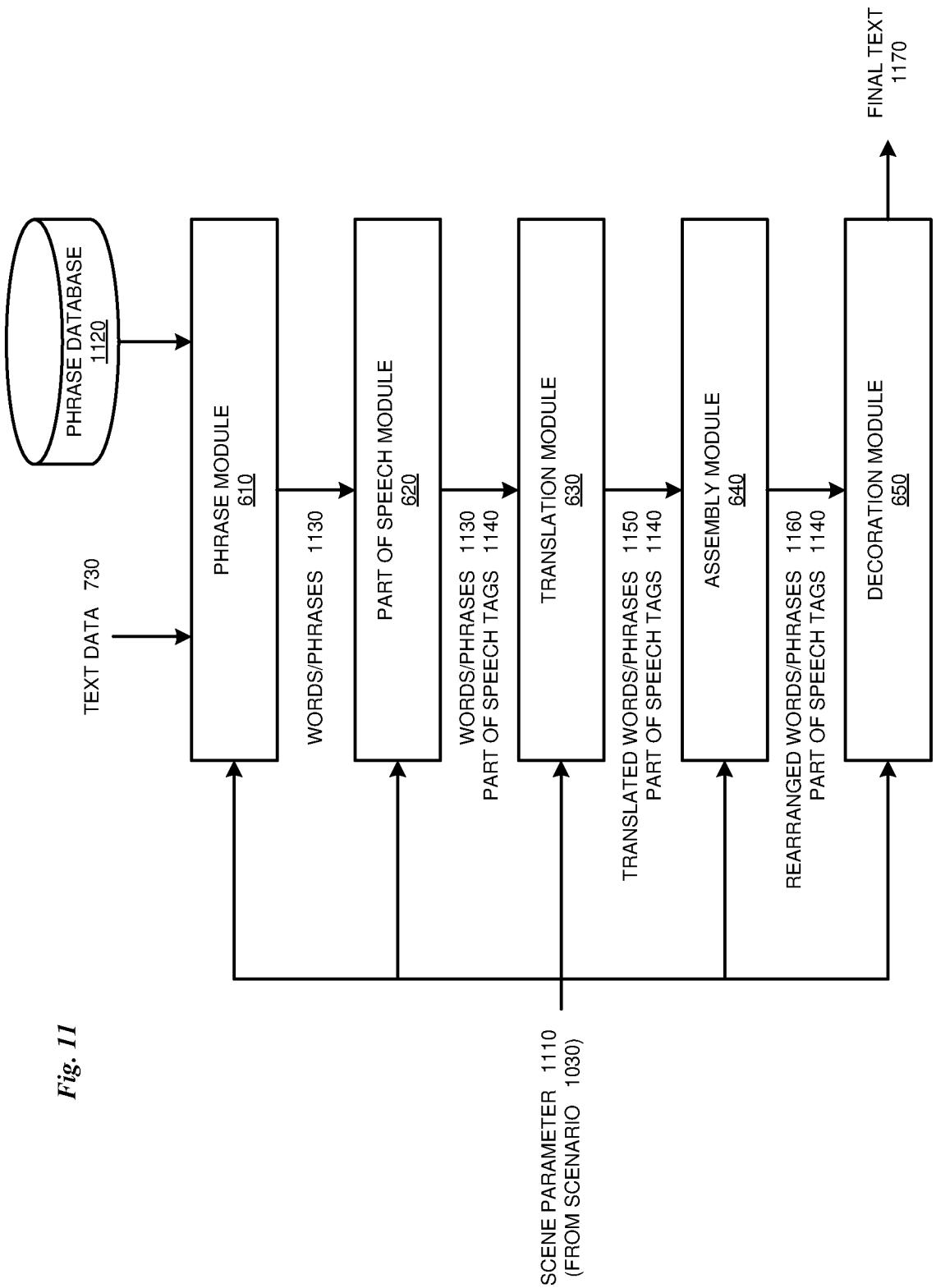
FIG. 11 depicts a continued example of scene recognition based natural language translation in accordance with an illustrative embodiment.

With reference to FIG. 11, this figure depicts a continued example of scene recognition based natural language translation in accordance with an illustrative embodiment. Phrase module 610, part of speech module 620, translation module 630, assembly module 640, and decoration module 650 are the same as phrase module 610, part of speech module 620, translation module 630, assembly module 640, and decoration module 650 in FIG. 6. Text data 730 is the same as text data 730 in Fig. Scenario 1030 is the same as scenario 1030 in FIG. 10.

Phrase module 610 attempts to group words within a portion of text data 730 into one or more phrases, using phrase database 1120 and scene parameter 1110 (defined in scenario 1030). The results are words/phrases 1130.

Part of speech module 620 uses scene parameter 1110 and a presently known technique to tag words/phrases 1130 with a part of speech tag. The results are part of speech tags 1140.

Translation module 630 uses scene parameter 1110, part of speech tags 1140, and a presently known technique to translate words/phrases 1130. The results are translated words/phrases 1150.

Assembly module 640 uses scene parameter 1110, part of speech tags 1140, and a presently known technique to rearrange translated words/phrases 1150 as appropriate for the new language. The results are rearranged words/phrases 1160.

Decoration module 650 uses scene parameter 1110, part of speech tags 1140, and a presently known technique to replace one or more of rearranged words/phrases 1160 with different ones, adjust punctuation if necessary, and add, remove, or adjust one or more connection words if necessary. The results are final text 1170, which replaces input text in an image.

Figure 12:
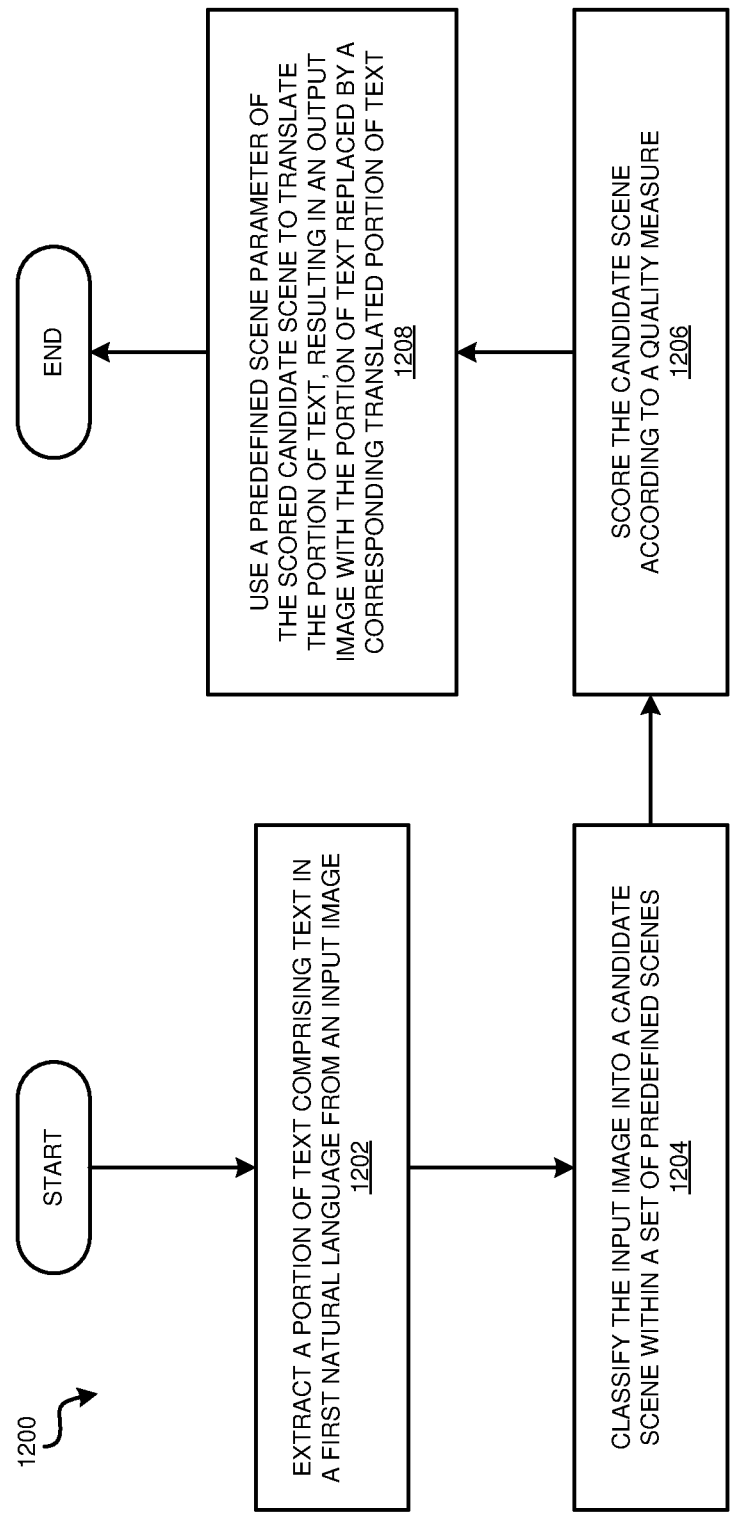
FIG. 12 depicts a flowchart of an example process for scene recognition based natural language translation in accordance with an illustrative embodiment.

With reference to FIG. 12, this figure depicts a flowchart of an example process for scene recognition based natural language translation in accordance with an illustrative embodiment. Process 1200 can be implemented in application 300 in FIG. 3.

In block 1202, the application extracts. a portion of text comprising text in a first natural language from an input image. In block 1204, the application classifies the input image into a candidate scene within a set of predefined scenes In block 1206, the application scores the candidate scene according to a quality measure. In block 1208, the application uses a predefined scene parameter of the scored candidate scene to translate the portion of text, resulting in an output image with the portion of text replaced by a corresponding translated portion of text. Then the application ends.

Figure 13:
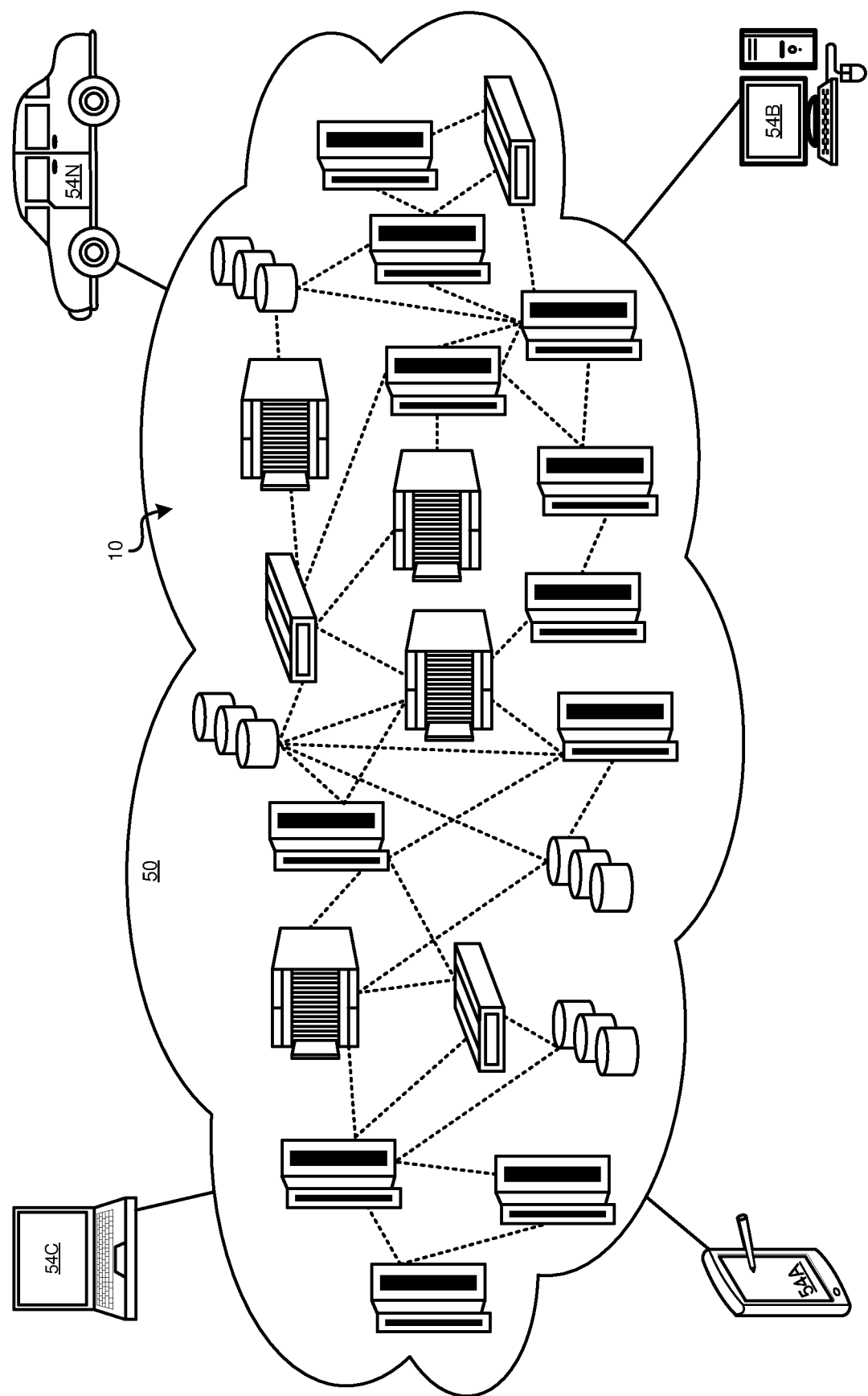
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 14:
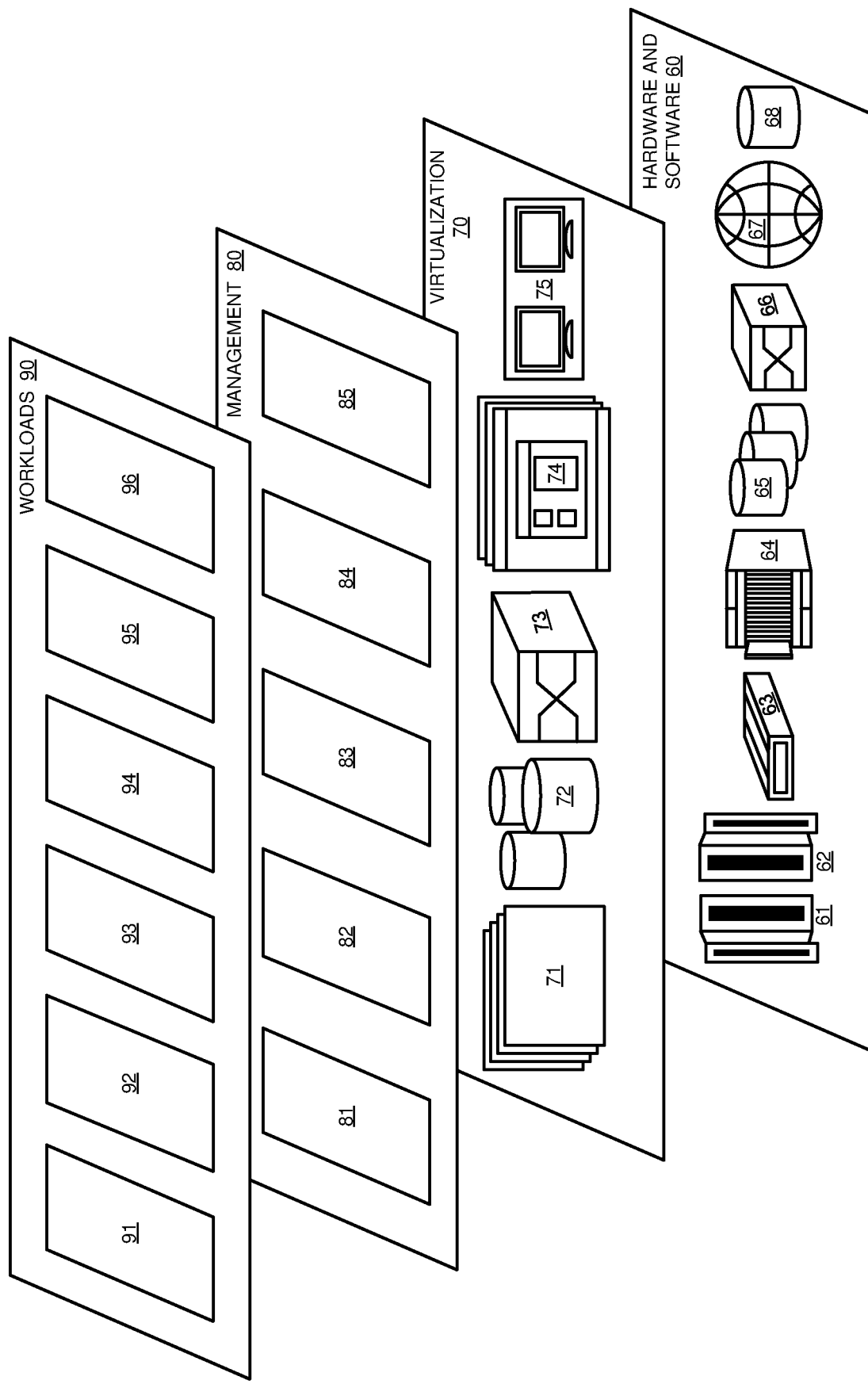
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for scene recognition based natural language translation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   extracting, from an input image comprising a portion of text, the portion of text, the portion of text comprising text in a first natural language;
   classifying the input image into a selected predefined scene within a set of predefined scenes, wherein each predefined scene in the set of predefined scenes includes a text label naming the predefined scene;
   scoring, according to a quality measure, the selected predefined scene, the scoring resulting in a scored selected predefined scene;
   translating, using a predefined scene parameter of the scored selected predefined scene, the portion of text to corresponding text in a second natural language, the translating resulting in a translated portion of text; and
   replacing, in the input image, the portion of text with the translated portion of text.

2. The computer-implemented method of claim 1, further comprising:
   converting an audio component of a video segment to the portion of text.

3. The computer-implemented method of claim 2, further comprising:
   converting the translated portion of text to a translated audio component; and
   replacing, in the video segment, the audio component with the translated audio component.

4. The computer-implemented method of claim 1, wherein the classifying uses audio data associated with the input image.

5. The computer-implemented method of claim 1, wherein the classifying uses location data associated with the input image.

6. The computer-implemented method of claim 1, wherein the classifying uses event data associated with the input image.

7. The computer-implemented method of claim 1, wherein the scoring comprises a sum of a set of weighted quality scores, each quality score in the set of quality scores rating a specificity of a type of data used to classify the input image.

8. The computer-implemented method of claim 1, further comprising:
   generating an annotated image, the annotated image comprising the input image, the portion of text, and the translated portion of text.

9. A computer program product for scene recognition based natural language translation, the computer program product comprising:
   one or more computer readable storage media, and program instructions collectively stored on the one or more computer readable storage media, the stored program instructions comprising:
   program instructions to extract, from an input image comprising a portion of text, the portion of text, the portion of text comprising text in a first natural language;
   program instructions to classify the input image into a selected predefined scene within a set of predefined scenes, wherein each predefined scene in the set of predefined scenes includes a text label naming the predefined scene;
   program instructions to score, according to a quality measure, the selected predefined scene, the scoring resulting in a scored selected predefined scene;

program instructions to translate, using a predefined scene parameter of the scored selected predefined scene, the portion of text to corresponding text in a second natural language, the translating resulting in a translated portion of text; and program instructions to replace, in the input image, the portion of text with the translated portion of text.

10. The computer program product of claim 9, the stored program instructions further comprising:

program instructions to convert an audio component of a video segment to the portion of text.

11. The computer program product of claim 10, the stored program instructions further comprising:

program instructions to convert the translated portion of text to a translated audio component; and program instructions to replace, in the video segment, the audio component with the translated audio component.

12. The computer program product of claim 9, wherein the classifying uses audio data associated with the input image.

13. The computer program product of claim 9, wherein the classifying uses location data associated with the input image.

14. The computer program product of claim 9, wherein the classifying uses event data associated with the input image.

15. The computer program product of claim 9, wherein the scoring comprises a sum of a set of weighted quality scores, each quality score in the set of quality scores rating a specificity of a type of data used to classify the input image.

16. The computer program product of claim 9, the stored program instructions further comprising:

program instructions to generate an annotated image, the annotated image comprising the input image, the portion of text, and the translated portion of text.

17. The computer program product of claim 9, wherein the stored program instructions are stored in the at least one of the one or more storage media of a local data processing system, and wherein the stored program instructions are transferred over a network from a remote data processing system.

18. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 9, wherein the computer program product is provided as a service in a cloud environment.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to extract, from an input image comprising a portion of text, the portion of text, the portion of text comprising text in a first natural language;

program instructions to classify the input image into a selected predefined scene within a set of predefined scenes, wherein each predefined scene in the set of predefined scenes includes a text label naming the predefined scene;

program instructions to score, according to a quality measure, the selected predefined scene, the scoring resulting in a scored selected predefined scene;

program instructions to translate, using a predefined scene parameter of the scored selected predefined scene, the portion of text to corresponding text in a second natural language, the translating resulting in a translated portion of text; and program instructions to replace, in the input image, the portion of text with the translated portion of text.

* * * * *